(12) United States Patent
Rightley

(10) Patent No.: US 7,314,208 B1
(45) Date of Patent: Jan. 1, 2008

(54) APPARATUS AND METHOD FOR SELECTIVELY CHANNELING A FLUID

(75) Inventor: Michael Joseph Rightley, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 489 days.

(21) Appl. No.: 10/955,123

(22) Filed: Sep. 30, 2004

(51) Int. Cl.
*F16K 31/08* (2006.01)

(52) U.S. Cl. ............... 251/65; 251/75; 251/129.15; 251/331; 251/368

(58) Field of Classification Search ............ 251/65, 251/129.15, 129.16, 331, 368, 75
See application file for complete search history.

(56) References Cited

U.S. PATENT DOCUMENTS

| | | | | |
|---|---|---|---|---|
| 3,489,171 | A * | 1/1970 | Michael, Jr. et al. | 251/368 |
| 4,282,897 | A * | 8/1981 | de Mey, II | 251/368 |
| 4,299,252 | A * | 11/1981 | Reinicke | 251/65 |
| 4,988,074 | A * | 1/1991 | Najmolhoda | 251/65 |
| 5,050,838 | A * | 9/1991 | Beatty et al. | 251/11 |
| 5,161,779 | A * | 11/1992 | Graner et al. | 251/65 |
| 5,217,200 | A * | 6/1993 | Hutchings et al. | 251/65 |
| 5,265,843 | A * | 11/1993 | Kleinhappl | 251/65 |
| 5,322,258 | A * | 6/1994 | Bosch et al. | 251/65 |
| 6,056,269 | A * | 5/2000 | Johnson et al. | 251/331 |
| 6,517,045 | B1 * | 2/2003 | Northedge | 251/65 |
| 6,907,897 | B2 * | 6/2005 | Maula et al. | 251/331 |

OTHER PUBLICATIONS

Böhm et al., A Micromachined Silicon Valve Driven by a Miniature Bi-Stable Electro-Magnetic Actuator, *Sensors and Actuators*, 2000, pp. 77-83, vol. 80, Elsevier Science S.A., Lausanne, Switzerland.

Ziebart et al., Strongly Buckled Square Micromachined Membranes, *Sensors and Actuators*, 1999, pp. 423 col. 2, 428, 430 col. 1 para 2 vol. 8. No. 4, Elsevier Science S.A., Lausanne, Switzerland.

(Continued)

*Primary Examiner*—John Rivell

(57) ABSTRACT

An apparatus for selectively channeling a high temperature fluid without chemically reacting with the fluid. The apparatus includes an inlet and a membrane positioned adjacent to the inlet, each composed of a chemically inert material. The membrane is formed by compressive preloading techniques. The apparatus further includes a seat disposed on the inlet adjacent to the membrane. The seat is composed of a heat resistant and chemically inert material. Operation of the apparatus requires that the temperature of the fluid remains below the chemical characteristic melting point of the seat. The apparatus further includes an actuator coupled to the membrane for rendering the membrane in an open and a closed position with respect to the seat. Specifically, the actuator supplies a load in the normal direction to the membrane to selectively engage the membrane in a plurality of predetermined configurations. Operatively, the apparatus receives the fluid at the inlet. The fluid is received at a high temperature and is directed from the inlet to the membrane. In the closed position, the actuator engages the membrane to prevent the fluid from flowing from the inlet between the membrane and the seat. Alternatively, in the open position, the actuator engages the membrane to permit fluid flow from the inlet between the membrane and the seat to at least one outlet provided by the apparatus. In one exemplary embodiment, the fluid may be discharged from the at least one outlet to a sensor in fluid communication with the at least one outlet. Accordingly, the sensor may measure the fluid channeled through the heat resistant and chemically inert environment provided by the apparatus.

9 Claims, 7 Drawing Sheets

OTHER PUBLICATIONS

Malhaire et al., Mechanical Characterization and Reliability Study of Bistable $SiD_2$ /Si Membranes for Microfluidic Applications, *Sensors and Actuators*, 2002, pp. 216-218, vol. 99 Elsevier Science S.A., Lausanne, Switzerland.

Kramer et al., Postbuckled Micromachined Square Membranes Under Differential Pressure, *Journal of Micromechanics and Microengineering*, 2002, pp. 475-478, vol. 12, Institute of Physics Publishing/(IoP) Publishing Ltd., Bristol, United Kingdom.

\* cited by examiner

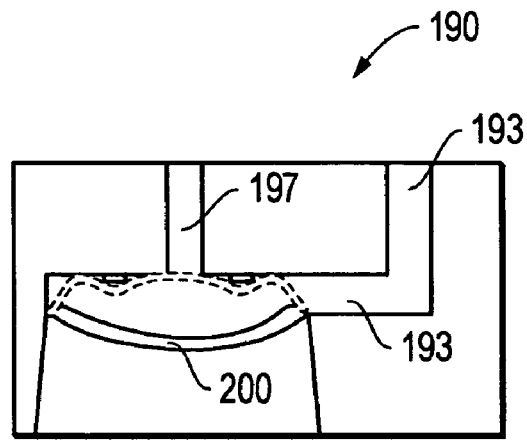
FIG. 8
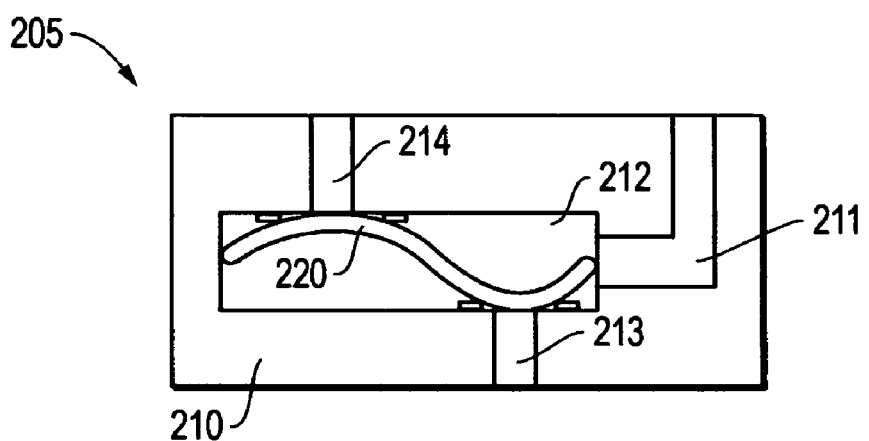
FIG. 9
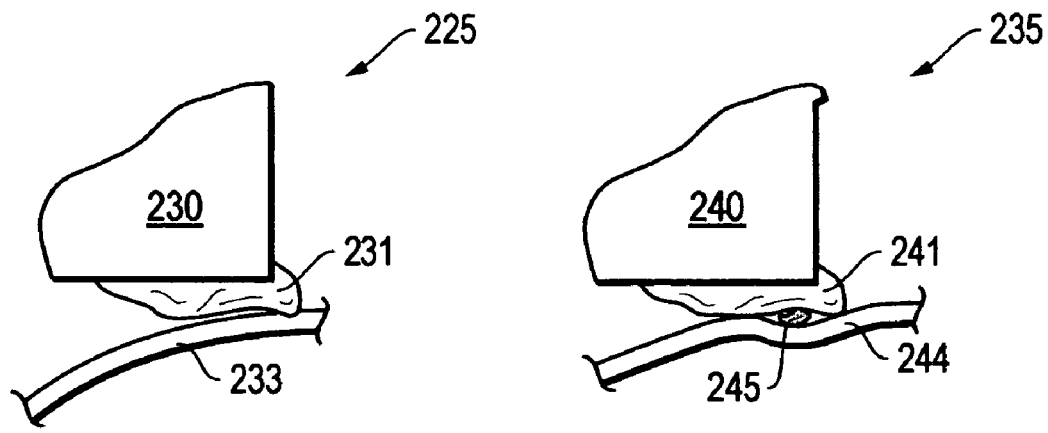
FIG. 10
FIG. 11

APPARATUS AND METHOD FOR SELECTIVELY CHANNELING A FLUID

STATEMENT OF GOVERNMENT INTEREST

This invention was developed under contract no. DE-AC04-94AL8500 between Sandia Corporation and the United States Department of Energy. The United States Government reserves certain rights in this invention.

BACKGROUND OF THE INVENTION

1. Field of the Invention

The present invention generally relates to an apparatus for selectively channeling a fluid. More particularly, but not by way of limitation, the present invention relates to a device and method for selectively channeling a fluid at a high temperature while providing a heat resistant and chemically inert flow path.

2. Description of the Related Art

Devices for controlling fluid flow are well known. For a wide variety of applications, the flow of either a gas or a liquid is often regulated by a valve. Illustratively, among other examples, valves may be applied for controlling the flow of a coolant fluid to an automobile radiator, controlling flow of intravenous fluids to a hospital patient, and controlling fluid flow in and out of a storage tank.

Generally, a valve applies an obstruction to a flow path to effectively permit or prevent fluid flow through the valve. Many typical valve devices feature an inlet, an outlet, and a valve unit positioned between the inlet and outlet. In operation, a valve unit regulates the flow of fluid from an inlet to an outlet between an open and a closed position.

There is currently a large assortment of commercially available valves for a variety of applications including, for example, ball valves, a butterfly valves, and membrane or "diaphragm" valves. Illustratively, for a membrane valve, a thin film or "membrane" is selectively engaged to plug a flow path between an inlet and an outlet. A membrane must characteristically be flexible, strong, and resilient to repetitively block the flow of fluid. Typically, membranes are constructed of a thin elastomeric material.

In practice, however, the periphery of a membrane often does not completely shut off fluid from escaping to an outlet. Valve units commonly include a seal to prevent small amounts of fluid from escaping from the periphery of a membrane to an outlet. In particular, a seat is provided to seal the edge of a valve piece, such as a membrane, to prevent fluid from escaping. Accordingly, in the continuing illustration, the edge of a membrane contacts against a seat to completely seal against escaping fluid and, thus, establishing a hermetic seal. Typically, a seat is formed of an elastomeric material having physical characteristics that permit the seat to at least partially deform when in contact with a membrane. Partial deformation of the seat thus creates a seal having a greater area of contact between the seat and the membrane. One popular example of a seat is an "O-ring". O-rings are commonly made of an elastomeric material such as rubber or a synthetic polymer.

At times, the physical characteristics associated with a fluid stream such as temperature or material composition have a direct effect on the performance of a valve. Illustratively, particulates within a fluid stream may chemically react with the structure of the valve to change the chemical integrity of the fluid stream as well as damage the structure of the valve. In one specific example, it could be said that many valves rely on elastomeric materials for its constituent parts, such as a membrane or a seat. During valve operation, some particulates from a flowing fluid may become ensnared within the tangled configuration of the elastomeric matrices of the constituent valve parts. Accordingly, the trapped particulates may chemically react with the valve parts to adversely change structural integrity of the valve unit or even the contaminate the chemical composition of the fluid.

Moreover, elastomeric materials commonly used in today's valves do not reliably function in the presence of extremes in temperature well above or below the standard room temperature of 25° C. Illustratively, due to the elastomeric construction of many of today's seats and valve membranes, the introduction of a high temperature fluid through a valve would most likely melt or vaporize the valve membrane and seat. Unfortunately, there is no known valve that does not affect the characteristic integrity of a high temperature, chemically reactive fluid flowing through the valve.

Therefore, a need exists for an apparatus for selectively channeling a fluid that is chemically inert to the fluid. There is also a need for an apparatus that will continuously operate to selectively channel a high temperature fluid therethrough. Many other problems and disadvantages of the prior art will become apparent to one skilled in the art after comparing such prior art with the present invention as herein described.

SUMMARY OF THE INVENTION

Aspects of the invention are found in an apparatus for selectively channeling a high temperature fluid without chemically reacting with the fluid. In one aspect, the apparatus includes an inlet and a membrane positioned adjacent to the inlet, each composed of a chemically inert material. In one aspect, the membrane is formed by compressive pre-loading techniques. The apparatus further includes a seat disposed on the inlet adjacent to the membrane. The seat in one aspect is composed of a heat resistant and chemically inert metallic material. In one aspect, operation of the apparatus requires that the temperature of the fluid remains below the chemical characteristic melting point of the seat. In one aspect, operation of the apparatus requires that the temperature of the fluid remains below the chemical characteristic melting point of the membrane. The apparatus further includes an actuator coupled to the membrane for rendering the membrane in an open and a closed position with respect to the seat. Specifically, the actuator supplies a load in the normal direction to the membrane to selectively engage the membrane in a plurality of predetermined configurations.

Operatively, the apparatus receives the fluid at the inlet. The fluid is received at a high temperature and is directed from the inlet to the membrane. In the closed position, the actuator engages the membrane to prevent the fluid from flowing from the inlet between the membrane and the seat. Alternatively, in the open position, the actuator engages the membrane to permit fluid flow from the inlet between the membrane and the seat to at least one outlet provided by the apparatus. In one aspect, the fluid may be discharged from the at least one outlet to a sensor in fluid communication with the at least one outlet. Accordingly, the sensor may measure the fluid channeled through the heat resistant and chemically inert environment provided by the apparatus.

In one aspect, a flow control system may be provided. The flow control system may include a hand-held device housing and an apparatus for selectively channeling a high temperature fluid without chemically reacting with the fluid. In effect, the hand-held device housing facilitates portability and overall ease of use in collecting and directing a high temperature fluid through the apparatus to a sensor provided by the flow control system.

In one aspect, an apparatus may be applied to a variety of settings for controlling the flow of a high temperature fluid without chemically reacting with the fluid. For example, the apparatus may be applied to controlling the flow of gaseous chemicals in the chemical processing industry, especially when applied to hazardous material detection systems. Moreover, in one example, the apparatus may be applied to controlling flow in either biological or medical fluid streams.

Other aspects, advantages, and novel features of the present invention will become apparent from the detailed description of the present invention when considered in conjunction with the accompanying drawings.

BRIEF DESCRIPTION OF THE DRAWINGS

The present invention is illustrated by way of example and not by limitation in the accompanying figures, in which like references indicate similar elements, and in which:

FIG. 8 is an orthographic view from the side illustrating one exemplary embodiment of an apparatus for selectively channeling a high temperature fluid, the apparatus including a membrane for selective engagement with an outlet;

FIG. 9 is an orthographic view from the side illustrating one exemplary embodiment of an apparatus for selectively channeling a high temperature fluid, the apparatus includes a membrane for engagement with a plurality of outlets;

FIG. 10 is a cut-away view from the side illustrating one exemplary embodiment of an apparatus for selectively channeling a high temperature fluid, the apparatus including a seat for engagement with a membrane;

FIG. 11 is a cut-away view from the side illustrating one exemplary embodiment of an apparatus for selectively channeling a high temperature fluid, the apparatus including a seat shown in engagement with a membrane and in contact with a particle defect;

Skilled artisans appreciate that elements in the Figures are illustrated for simplicity and clarity and have not necessarily been drawn to scale. For example, the dimensions of some of the elements in the Figures may be exaggerated relative to the other elements to help improve understanding of the embodiments of the present invention.

DETAILED DESCRIPTION

For a more complete understanding of the present invention, preferred embodiments of the present invention are illustrated in the Figures. Like numerals being used to refer to like and corresponding parts of the various accompanying drawings. It is to be understood that the disclosed embodiments are merely exemplary of the invention, which may be embodied in various forms.

Figure 1:
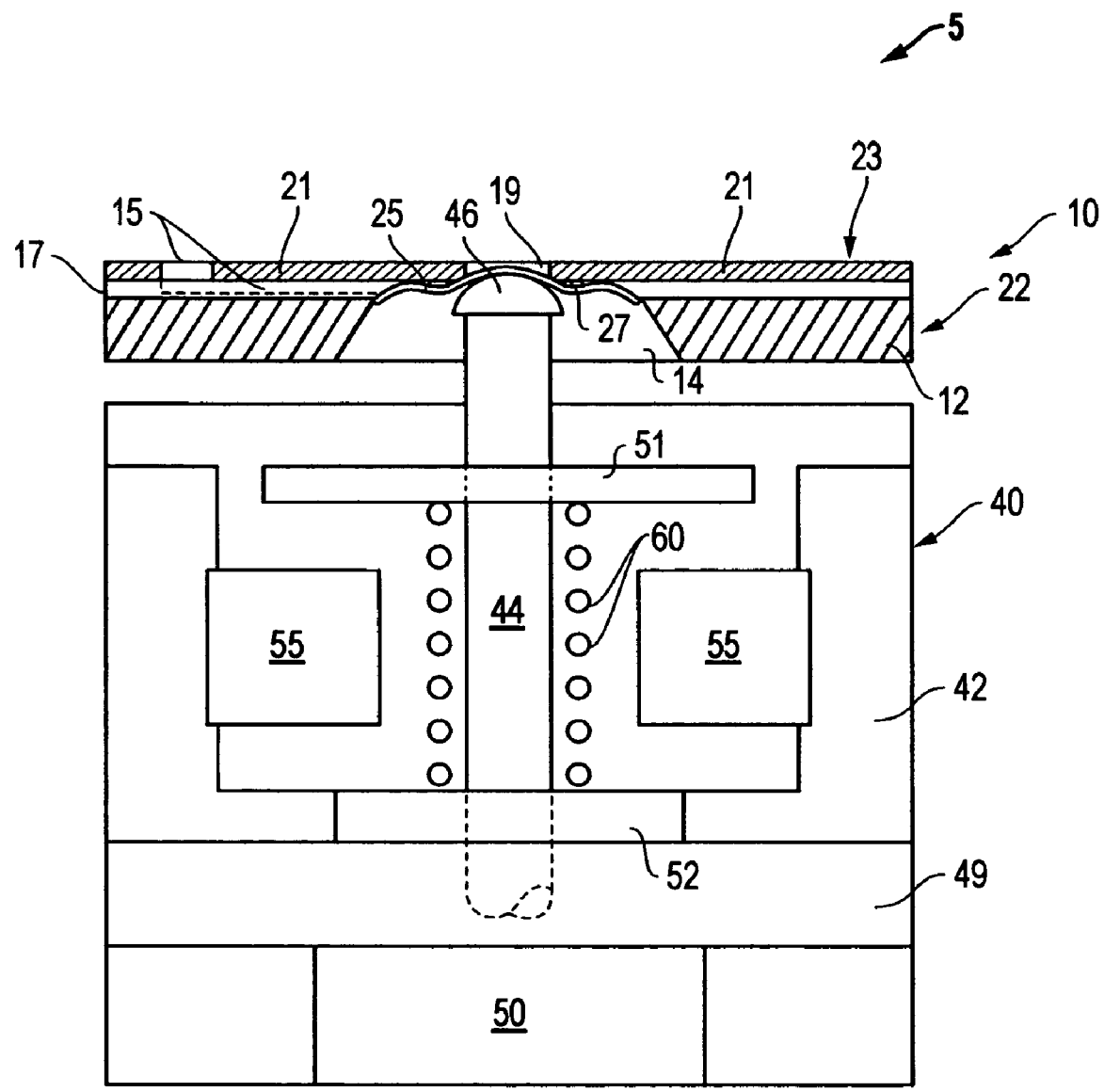
FIG. 1 is an orthographic view from the side illustrating an apparatus for selectively channeling a fluid according to the present invention, the apparatus provides a chemically inert environment for directing a variety of fluids therethrough including high temperature fluids.

FIG. 1 illustrates one aspect, among others, of apparatus 5 for selectively channeling a fluid. The apparatus 5 (which is also referred to herein as a valve) includes a fluid control assembly 10. In operation, the fluid control assembly 10 permits or prevents the flow of a high temperature fluid without chemically reacting with the high temperature fluid. Furthermore, in one exemplary embodiment, the apparatus 5 may be miniaturized to occupy a volume of less than one cubic centimeter and a mass of less than one gram to control the flow of a high temperature fluid without chemically reacting with the high temperature fluid.

In one exemplary embodiment, the fluid control assembly 10 of FIG. 1 may be divided into two portions. Specifically, the fluid control assembly 10 includes a membrane assembly 22 and a fluid assembly 23.

The fluid assembly 23 is formed by a manifold body 21. The manifold body 21 is composed of a chemically inert material, such as silicon or silicon dioxide. In this disclosure and appended claims, the term "chemically inert" refers to a characteristic property of a material for preventing a chemical reaction or series of reactions while interacting with a fluid or with that fluid's molecular constituents.

As shown in FIG. 1, the manifold body 21 defines an inlet 15. The inlet 15 is composed of a chemically inert material such as silicon or silicon dioxide. In operation, a fluid is received at a high temperature at the inlet 15 and is directed therethrough.

The fluid assembly 23 further includes an outlet 19. The outlet 19 is composed of a chemically inert material such as silicon or silicon dioxide. In operation, a high temperature fluid exits the fluid control assembly 10 at the outlet 19. In one exemplary embodiment, a high temperature fluid exits the outlet 19 and may be received by a sensor (not shown). The sensor is in fluid communication with the outlet 19 to thus receive the high temperature fluid for measurement thereof. Therefore, the heat resistant and chemically inert characteristics of the apparatus 5 should not interfere with the fluid measurement.

The fluid assembly 23 further includes a seat 27. As shown in FIG. 1, the seat 27 is disposed on the manifold body 21 and is positioned about the periphery of the outlet 19. In one exemplary embodiment, the seat 27 is an annular member positioned about the periphery of the outlet 19. In operation, the seat 27 provides a hermetic seal to prevent high temperature fluid from escaping through the seat 27 to the outlet 19.

It must be added that in one exemplary embodiment, the seat 27 is composed of a heat resistant and chemically inert material such as metallic gold. In one exemplary embodiment, the seat 27 may be composed of a metallic material having malleable, chemically inert, and heat resistant properties. In this disclosure and appended claims the term "high temperature" refers to a condition by which the successful operation of an apparatus requires that the temperature of a fluid remains below the characteristic chemical melting point of a seat or a membrane, whichever is lower. Moreover, in this disclosure and appended claims the term "heat resistant" refers to the ability to operate in the presence of a high temperature fluid.

Illustratively, in one exemplary embodiment, the seat 27 is composed of a metallic material such as gold. In particular, a metallic material provides the seat 27 with malleable, chemically inert, and heat resistant properties. A metallic material ensures that the seat 27 will partially deform so as to create a hermetic seal while in engagement with high temperature fluids having a temperature reading below that of the characteristic chemical melting point of the seat's 27 constituent metal. Accordingly, a metallic seat provides for operation at a greater range of fluid temperatures. For example, a metallic gold seat may operate to form a hermetic seal and deform accordingly when engaged with fluid streams below 350° C. It should be added that for temperatures above the melting point the material comprising the seat 27, the seat 27 fails to operate in that it is either melted or burned-off. In one exemplary embodiment, the seat 27 may be composed of a non-elastomeric material having malleable, chemically inert, and heat resistant properties.

In one exemplary embodiment, the seat 27 may be composed of a chemically inert material without heat resistant properties. Accordingly, the seat 27 will not undergo a chemical reaction while interacting with a fluid stream.

Referring to FIG. 1, the flow control assembly 10 further includes a membrane 25 in engagement with the membrane assembly 22. The membrane assembly 22 is formed of a membrane support body 12. As shown in FIG. 1, the membrane support body 12 defines a membrane chamber 14. The membrane chamber 14 houses the membrane 25 therein. In one exemplary embodiment, the membrane chamber 14 provides room to accommodate movement of membrane 25 as rendered in an open and a closed position.

In one exemplary embodiment as shown in FIG. 1, the flow control assembly 10 may include a spacer 17. The spacer 17 is composed of a heat resistant and chemically inert material, such as PYREX or other ceramics and glasses. In operation, the spacer 17 is positioned about the perimeter of the membrane 25 to provide room to accommodate movement of the membrane 25 as rendered in an open and in a closed position.

In one exemplary embodiment, the spacer 17 may further include a directional channel. A directional channel may facilitate fluid flow through an inlet to a valve membrane.

As shown in FIG. 1, the membrane 25 is rendered in a closed position. In the closed position, the membrane 25 shuts-off fluid flow from the inlet 15 to the outlet 19.

Accordingly, the apparatus 5 further includes an actuator 40. The actuator 40 is coupled to the flow control assembly 10 to engage the membrane 25 in either an open or a closed position. It should be added that the membrane 25 is in contact with the seat 27, the manifold body 21, and the membrane support body 12 to hermetically seal fluid flow from the inlet 15 to the outlet 19.

In operation, in one exemplary embodiment, the actuator 40 is operatively connected to move the membrane 25 back and forth between a pair of stable states corresponding to opening and closing of the valve 5. The actuator 40 thus selectively engages the membrane 25 in at least one predetermined position.

In one exemplary embodiment, the membrane 25 comprises a bi-stable compressively preloaded element. Specifically, in one exemplary embodiment, the membrane 25 comprises an element composed of a layer of silicon dioxide and layer of silicon disposed on the layer of silicon dioxide. The silicon-silicon dioxide element is formed by compressive preloading techniques well known in the industry.

Illustratively, in one exemplary embodiment, a silicon-silicon dioxide element may be formed by silicon-on-insulator deposition and backside wet etching techniques. In particular, the silicon-silicon dioxide element is initially formed with the deposition of a layer of single crystal silicon on a silicon dioxide substrate layer. Moreover, in one exemplary embodiment, additional layers of nitride and of polysilicon may be added to the silicon-silicon dioxide element to ultimately add mechanical strength. The silicon-silicon dioxide element is then subjected to thermal oxidation within a steam environment at 1100° C. and, subsequently, allowed to cool to room temperature. A compressive stress is thus created between silicon-silicon dioxide layers by a variation in thermal coefficients of expansion between the at least two layers, whereby each layer is formed of a different material composition. In one exemplary embodiment, the compressive stress enables the silicon-silicon dioxide element to reliably buckle in two configurations and, hence, forming a bi-stable compressively preloaded membrane. It should be added that backside wet etching techniques are then employed to define a desired shape for the membrane. Accordingly, in one exemplary embodiment, a membrane may define a square shape 10 mm on a side, within a thickness range from 20 to 100 microns, and with 75 microns of deflection from a neutral position.

A bi-stable compressively preloaded element enables a valve membrane to reliably buckle in two stable configurations. Illustratively, a bi-stable compressively preloaded membrane may exhibit two stable configurations as shown in FIGS. 8 & 9, i.e. a one-half sinusoidal wave function configuration and a full sinusoidal wave function configuration, respectively. Accordingly, in one exemplary embodiment, minimal loading is needed to render the membrane 25 in either of the two compressively preloaded states. It should be added that those of ordinary skill in the art will readily recognize numerous other compressively preloaded configurations by which to program a valve membrane in response to a loading stimulus. It should be further added that the membrane 25 is composed of a chemically inert and heat resistant material.

Referring to FIG. 1, the actuator 40 includes an armature 46. The membrane 25 is coupled to the armature 46 by any suitable means readily recognized by those of ordinary skill in the art. For example, the membrane 25 may be coupled to the armature 46 through soldering methods or with the application of a heat-resistant epoxy bond.

Operatively, the actuator 40, coupled to the membrane 25, renders the membrane 25 in a closed and in an open position with respect to the seat 27. In the open position, the apparatus 5 receives a fluid at the inlet 15. The fluid is received at a high temperature and is directed from the inlet 15 to the membrane 25. The actuator 40 in the open position permits the fluid to flow from the inlet 15 between the membrane 25 and the seat 27 to the outlet 19. The fluid is thus discharged from the flow control assembly 10 at the outlet 19. In one exemplary embodiment, a sensor, in fluid communication with the outlet 19, may receive the fluid discharged from the outlet 19 for measurement thereof.

Alternatively, in the closed position shown in FIG. 1, the actuator 40 prevents the fluid from flowing from the inlet 15 between the membrane 25 and the seat 27. In specific reference to FIG. 1, the armature 46 is engaged by an armature driver 44. The armature 46 thus supplies a load in the normal direction to the membrane 25. The application of the load renders the membrane 25 in a predetermined configuration for sealing the outlet 19 from receiving the fluid.

In one exemplary embodiment, the armature driver 44 comprises a solenoid. Accordingly, a coil unit 55 wraps around the armature driver 44. The coil unit 55 provides linear actuation to the armature driver 44 with respect to the armature 46 and the membrane 25. Operatively, the actuator 40 requires a brief pulse of electric power to reverse directions of the armature driver 44 via the coil unit 55, such as an operating power in the range of 100 milliWatts (mW) to 1 Watt (W).

The actuator 40 of FIG. 1 is optimally configured for low power consumption during operation. In one exemplary embodiment, the apparatus 5 of FIG. 1 may be suitable for a portable hand-held device that is actuated by battery power for ultimately rendering the membrane 25 in either an open or a closed position.

Overall, minimal external assistance is required to render the membrane 25 in an open and a closed position. Specifically, in one exemplary embodiment, the compressively preloaded bi-stable configurations of the membrane 25 of FIG. 1 requires very little loading input for rendering the membrane 25 in a desired configuration. Therefore, an actuator having a spring, a permanent magnet, and a solenoid arrangement similar to FIG. 1 may cooperatively draw a minimum amount of electrical energy for actuation of a membrane.

Referring to FIG. 1, the actuator 40 provides a magnetic member 50 and a spring 60. The magnetic member 50 and the spring 60 are in cooperative engagement with the armature driver 44. Moreover, an armature plate 51 is fixedly secured to the armature driver 44. The armature plate 51 is positioned on the spring 60. It should be added, that in one exemplary embodiment, the armature plate 51 is composed of a magnetic material. The actuator 40 of FIG. 1 further includes a base plate 52. The base plate 52 is operatively positioned below the spring 60 and is held in position by an actuator flame 42. In one exemplary embodiment, as shown in FIG. 1, the base plate 52 may be held in position by an actuator spacer 49.

In operation, the base plate 52 of FIG. 1 is configured to allow the armature driver 44 to pass through the base plate 52 as the armature driver 55 is actuated. In an open position, a brief pulse of electricity is required to enable the coil unit 55 to initially drive the armature driver 44 toward to magnetic member 50. While advancing toward the magnetic member 50, the armature plate 52 becomes increasingly magnetically attracted to the magnetic member 50. In effect, the armature plate 52 becomes magnetically fixated in a stable position as the spring 60 provides a counteracting force with respect to the armature plate 52 to prevent direct contact with the magnetic member 50. Ultimately, the membrane 25 of FIG. 1 is rendered in an open position as the magnetic member 50 magnetically sustains the armature 46 in position with minimal external assistance, such as electrical power.

Alternatively, in a closed position, the polarity of the electrical pulse to the coil unit 55 is reversed to thus direct the armature driver 44 away from the magnetic member 50 and toward the outlet 19. Moreover, as the spring 60 pushes outwardly from the base plate 52, the spring 60 extends away from the attractive effects characteristic of the magnetic member 50. Therefore, the spring 60 and the electrical pulse sent to the armature driver 44 cooperate to project the armature plate 51 and, ultimately, membrane 25 toward the outlet 19 to seal the outlet 19 from fluid flow.

Figure 2:
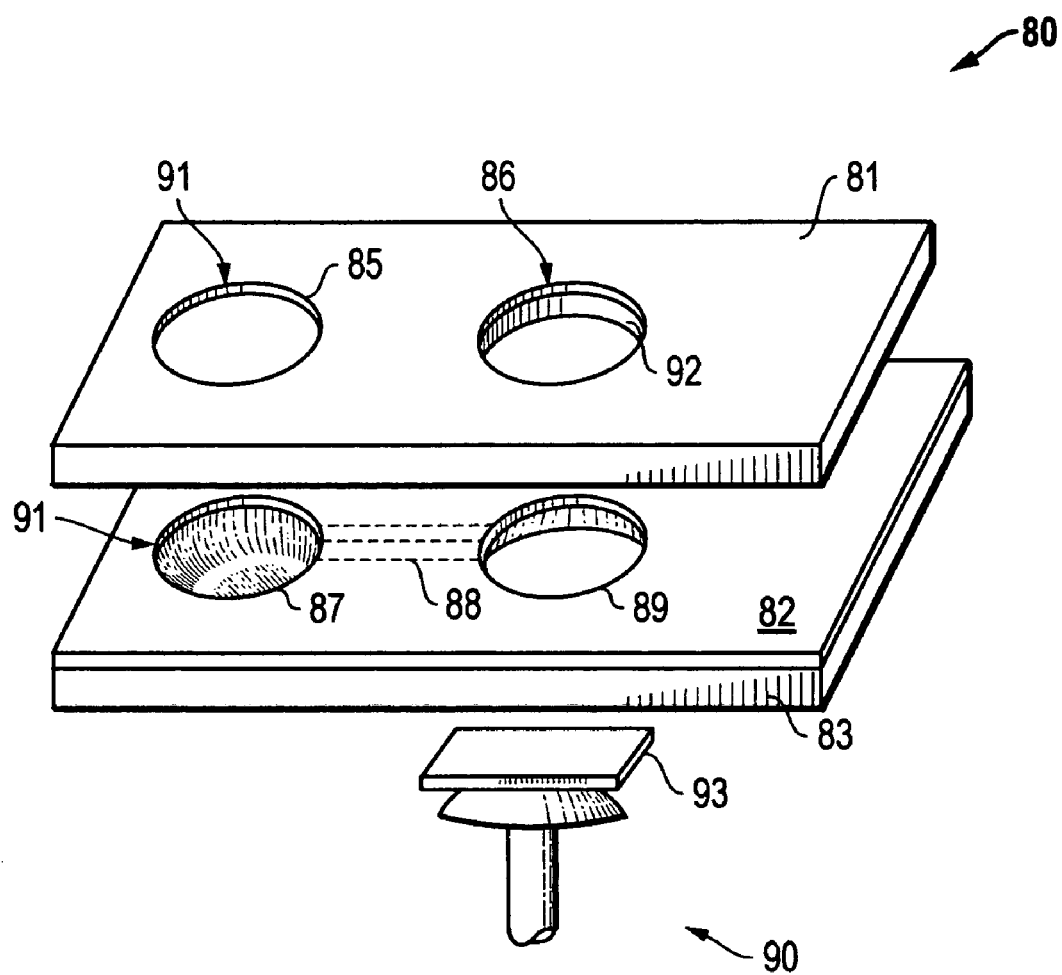
FIG. 2 is an exploded isometric view illustrating one exemplary embodiment of an apparatus for selectively channeling a high temperature fluid.

FIG. 2 illustrates an apparatus 80 for selectively channeling a fluid. The apparatus 80 includes an inlet 91. As shown in FIG. 2, the inlet 91 includes a series of component parts that collectively act to receive and direct a high temperature fluid for selective discharge from an outlet 86.

The inlet 91 includes an inlet opening 85. The inlet opening 85 is formed by a manifold body 81. The apparatus 80 operatively receives a fluid at the inlet opening 85. For the embodiment of FIG. 2, the apparatus 80 includes a spacer 82. The inlet 91 further includes an inlet opening interface 87. The inlet opening interface 87 is formed by both the spacer 82 and a membrane support body 83 positioned below the spacer 82. The inlet 91 further includes a directional channel 88. In one exemplary embodiment, the directional channel 88 is formed by the spacer 82 and the membrane support body 83. The inlet 91 further includes an inlet seat interface 89. The inlet seat interface 89 of FIG. 2 is defined by the spacer 82.

Operatively, a fluid flows at a high temperature from the inlet opening 85, to the inlet opening interface 87, across the directional channel 88, and to the inlet seat interface 89. It should be added that the material defining the chamber of the inlet 91 is composed of a chemically inert material.

The apparatus 80 further includes a seat 92. In an operative configuration, the seat 92 is disposed on the inlet 91 adjacent to a membrane 93. The seat 92 in one exemplary embodiment is composed of a heat resistant and chemically inert material, such as metallic gold.

The apparatus 80 further includes an actuator 90 coupled to the membrane 93 for rendering the membrane 93 in a closed and in an open position with respect to the seat 92. The apparatus 80 of FIG. 2 further includes an outlet 86. In one exemplary embodiment, the outlet 86 is formed by the manifold body 81. The outlet 86 is characterized as a region on a flow path positioned beyond the seat 92.

Operatively, a high temperature fluid such as a gas or a liquid is received by the inlet 91 at the inlet opening 85. The high temperature fluid is directed from the inlet opening 85, through the inlet opening interface 87, across the direction channel 88, through the inlet seat interface 89, and toward the membrane 93. In the open position, the actuator 90 permits the high temperature fluid to flow from the inlet 91, between the membrane 93 and the seat 92, through the outlet 86, and out the apparatus 80. In the closed position, the actuator 90 prevents the fluid from flowing from the inlet 91 between the membrane 93 and the seat 92.

Figure 3:
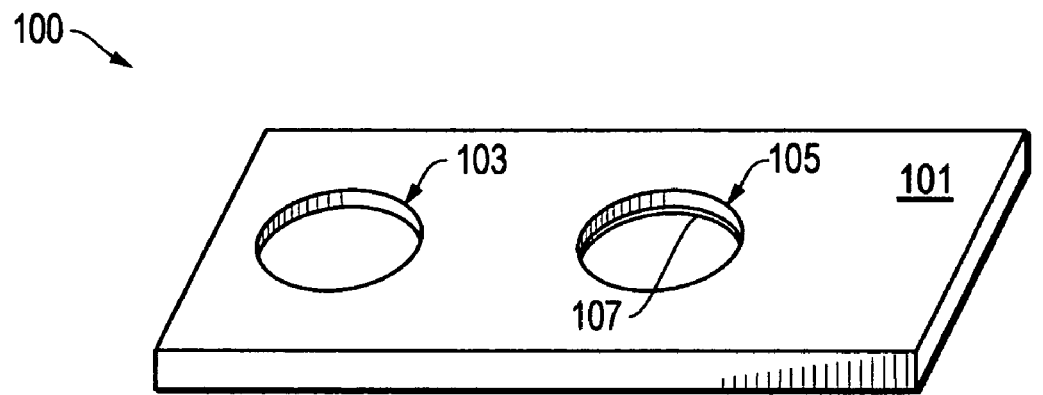
FIG. 3 is an isometric view illustrating one exemplary embodiment of a fluid control assembly provided by an apparatus for selectively channeling a fluid, the fluid assembly includes an inlet and an outlet for directing a high temperature fluid therethrough.

FIG. 3 illustrates one exemplary embodiment of a fluid assembly 100 of an apparatus for selectively controlling fluid flow. The fluid assembly 100 includes an inlet 103. The inlet 103 is formed by a manifold body 101. The fluid assembly 100 further includes an outlet 105. The outlet 105 is defined by the manifold body 101.

As shown in FIG. 3, the fluid assembly 100 further includes a seat 107. The seat 107 is disposed on the manifold body 101 adjacent to the outlet 105.

Figure 4:
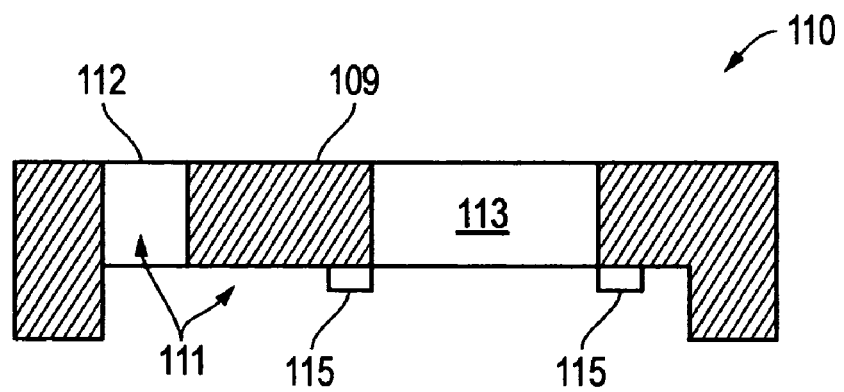
FIG. 4 is an orthographic side view illustrating one exemplary embodiment of a fluid control assembly provided by an apparatus for selectively channeling a high temperature fluid, the fluid control assembly includes a seat for engagement with a membrane.

FIG. 4 illustrates one exemplary embodiment of a fluid assembly 110 of an apparatus for selectively controlling fluid flow. The fluid assembly 110 includes an inlet 111. The inlet 111 includes an inlet opening 112.

Shown in FIG. 4 as an orthographic section, the inlet 111 and inlet opening 112 are at least in part defined by a manifold body 109. The fluid assembly 110 further includes an outlet 113. The outlet 113 is defined by the manifold body 109.

The fluid assembly 110 further includes an annular seat 115 disposed on the manifold body 109 adjacent to the outlet 113.

Figure 5:
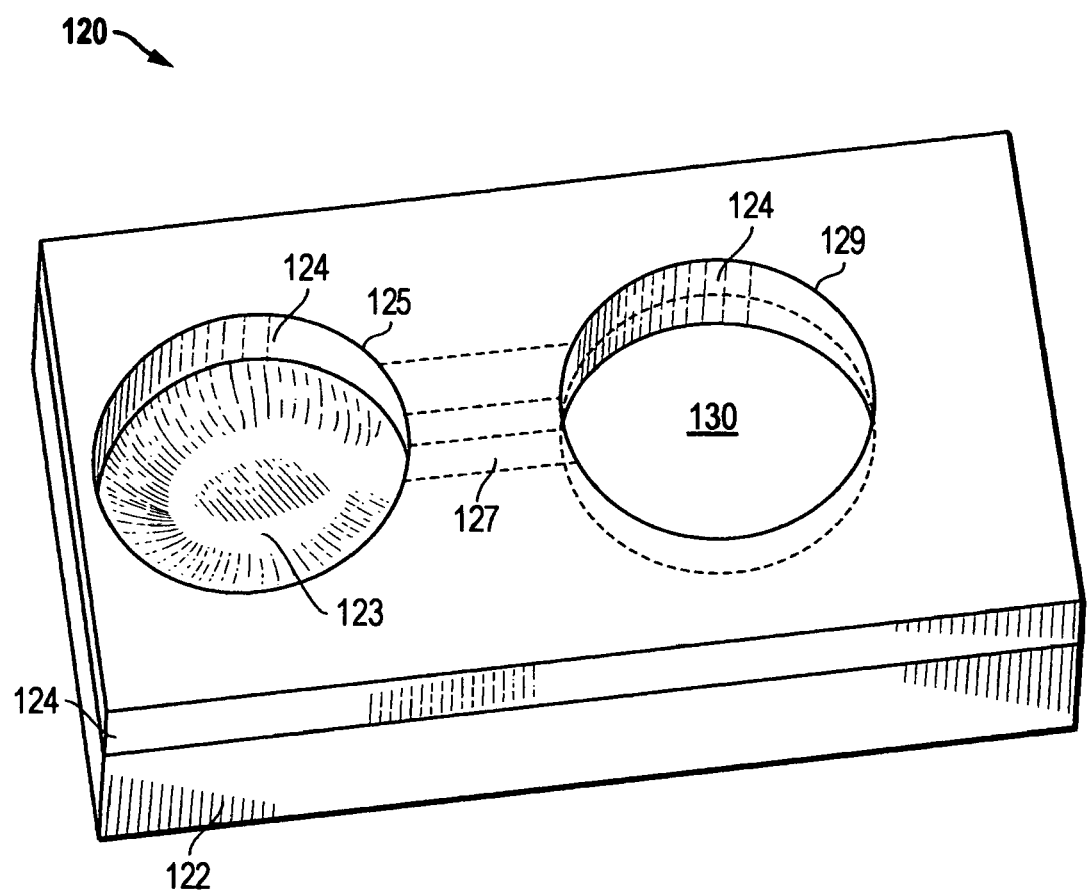
FIG. 5 is an isometric view illustrating one exemplary embodiment of a membrane assembly in cooperative engagement with a membrane.

FIG. 5 illustrates a membrane assembly 120 of an apparatus for selectively controlling fluid flow. The membrane assembly 120 includes a membrane support body 122 and a spacer 124 disposed atop the membrane support body 122.

The membrane support assembly 120 includes an inlet opening interface 125, a directional channel 127, and an inlet seat interface 129. The inlet opening interface 125, the directional channel 127, and the inlet seat interface 129 are all in fluid communication with one another. The inlet opening interface 125, the directional channel 127, the inlet seat interface 129, and the membrane support body 122 cooperate to ultimately define, in part, an inlet for selectively channeling a high temperature fluid.

FIG. 5 further shows a membrane 130 coupled to the membrane assembly 120. It should be added that in one exemplary embodiment, the membrane support body 122 may define a recess 123. Operatively, as shown in FIG. 5, the recess 123 may be configured to enhance fluid flow through the inlet.

Figure 6:
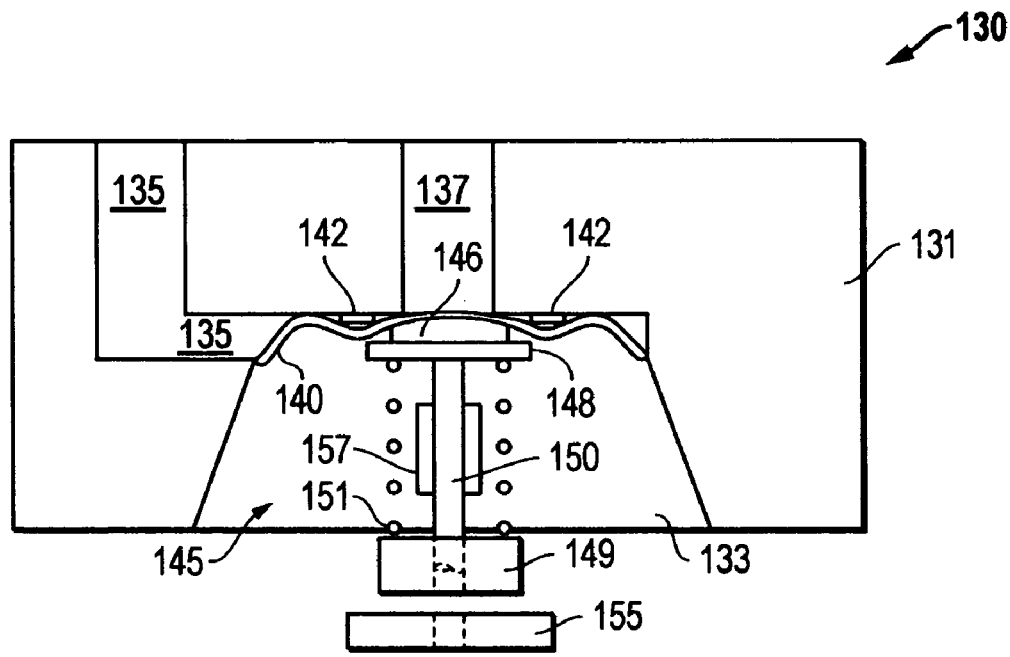
FIG. 6 is an orthographic view from the side illustrating one exemplary embodiment of an apparatus for selectively channeling a high temperature fluid, the apparatus is rendered in a closed position by which a membrane, an actuator, and a seat cooperate to seal-off fluid flow to an outlet.

FIG. 6 illustrates one exemplary embodiment of an apparatus 130 for selectively channeling a high temperature fluid. The apparatus 130 includes a body 131. The body 131 defines an inlet 135 and an outlet 137. In one exemplary embodiment, as shown in FIG. 6, the body 131 is formed from a single piece.

The apparatus 130 of FIG. 6 shows a membrane 140 rendered in a closed position. In one exemplary embodiment, the membrane 140 comprises a bi-stable compressively preloaded element further comprising a layer of silicon integrally bonded to a layer of silicon dioxide.

The membrane of FIG. 6 is coupled to an actuator 145. Those of ordinary skill in the art will readily recognize that the actuator 145 may comprise any actuation device widely known in the industry for engaging a membrane. The actuator 145 includes an armature 146 coupled to the membrane 140. As shown in FIG. 6, the armature 146 provides a load in the normal direction to the membrane 140 so that the membrane 140 may ultimately shut-off fluid flow to the outlet 137.

The armature 146 is actuated by an armature driver 150. In one exemplary embodiment, the armature driver 150 comprises a solenoid having a coil unit 157.

Operatively, a brief pulse of electricity is required to enable the coil unit 157 to initially move the armature driver 150 toward the outlet 137. As the armature driver 150 advances toward the outlet 137, a spring 151 is permitted to extend from a base member 149 toward the outlet 137. The spring 151 thus pushes against an armature plate 148 to ultimately render the membrane 140 in a closed position. The continued extension of the spring 151 against the armature plate 148 acts to maintain a hermetic seal created in part by the membrane 140. The body 131 further defines a membrane chamber 133 to provide room to accommodate movement of the membrane 140 as rendered in a closed and an open position.

The apparatus 130 further includes an annular seat 142. Shown in FIG. 6, the annular seat 142 is disposed on the body 131. The annular seat 142 is composed of a heat resistant and chemically inert material, such as a metal. In effect, the annular seat 142 and the membrane 140 cooperate to provide a hermetic seal for prohibiting fluid flow from the inlet 135.

Figure 7:
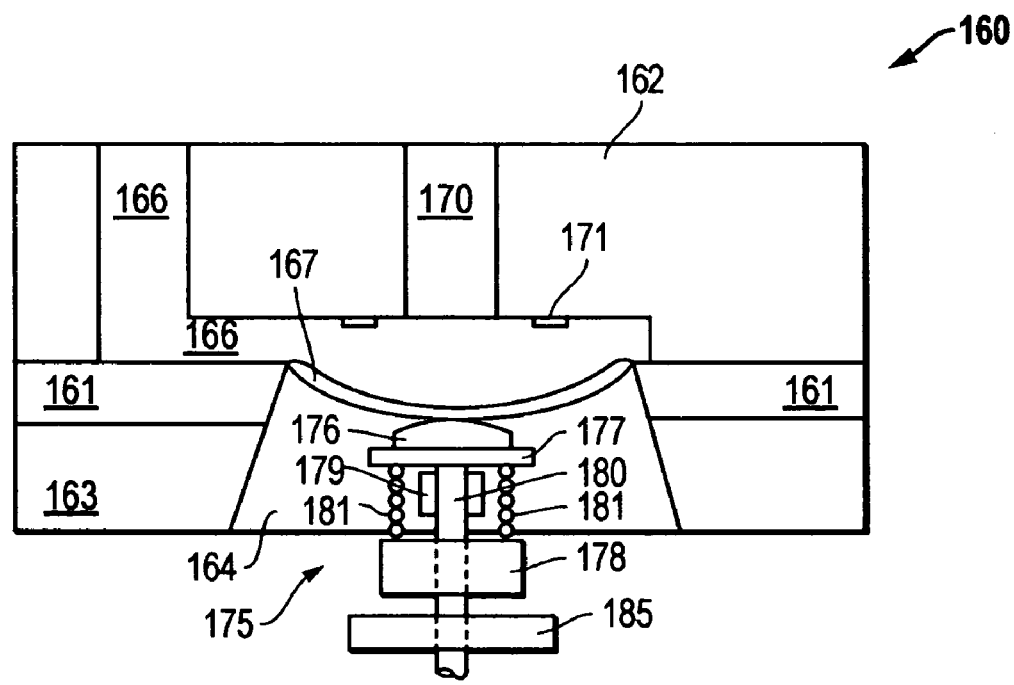
FIG. 7 is an orthographic view from the side illustrating one exemplary embodiment of an apparatus for selectively channeling a high temperature fluid, the apparatus is rendered in an open position by which the fluid flows from an inlet between a membrane and a seat to an outlet.

FIG. 7 illustrates one exemplary embodiment of an apparatus 160 for selectively channeling a high temperature fluid. The apparatus 160 of FIG. 7 is rendered in an open position.

The apparatus 160 includes a first body segment 162 and a second body segment 163 coupled to the first body segment 162. The first body segment 162 forms an inlet 166 and an outlet 170. A seat 171 is disposed on the first body segment 162 adjacent to the outlet 170. The second body segment 163, in part, defines a membrane chamber 164. The membrane chamber 164 houses a membrane 167.

In one exemplary embodiment, the apparatus 160 may further include a spacer 161. The spacer 161 of FIG. 7 is positioned between the first body segment 162 and the second body segment 163. Operatively, the spacer 161 provides room to accommodate movement of the membrane 167 as rendered in an open and a closed position.

The membrane 167 is coupled to an actuator 175. In operation, as shown in FIG. 7, the actuator 175 provides a load in the normal direction to configure the membrane 167 in an open position with respect to the seat 171.

Accordingly, the actuator 175 includes an armature 176. The armature 176 is coupled to the membrane 167 and an armature plate 177. The armature plate 177 of FIG. 7 is coupled to an armature driver 180.

In one exemplary embodiment, the armature driver 180 comprises a solenoid. Operatively, an electric pulse is sent through coils 179 provided by the solenoid to direct the armature driver 180 away from the outlet 170 toward a magnetic member 185. As the armature driver 180 moves toward the magnetic member 185, the armature plate 177 becomes increasingly attracted to the magnetic member 185. Ultimately, equilibrium is achieved between the magnetically attractive force of the armature plate 177 and the magnetic member 185 with respect to a counteractive force delivered by a spring 181 in engagement with the armature plate 177. The arrangement of the spring 181, the magnetic member 185, and armature driver 180 cooperatively draws a minimal amount of electrical energy for actuation of the membrane 167.

It should be added that in one exemplary embodiment, the magnetic member 185 comprises a rare earth permanent magnet, such as a samarium-cobalt (Sm—Co) permanent magnet, to bias the membrane 167 in an open and closed position. Moreover, referring to FIG. 7, a base member 178 is provided to mechanically support the spring 181 but does not magnetically effect the equilibrium achieved by the armature plate 177 and the magnetic member 185.

Operatively, in the open position, the apparatus 160 receives a high temperature fluid at the inlet 166. The fluid is then directed from the inlet 166 toward the membrane 167. In particular, the actuator 175 applies a load in the normal direction to the membrane 167. The membrane 167 is then rendered in a predetermined configuration that permits the fluid to flow from the inlet 166 between the membrane 167 and the seat 171 toward the outlet 170. In one exemplary embodiment, the apparatus 160 includes a sensor (not shown) in fluid communication with the outlet 170. Accordingly, the high temperature fluid is dispensed from the outlet 170 to the sensor. The sensor may then measure characteristics associated with the fluid.

FIG. 8 illustrates one exemplary embodiment of an apparatus 190 for selectively channeling a high temperature fluid. In particular, the apparatus 190 includes an inlet 193 and an outlet 197. The inlet 193 and the outlet 197 are both in fluid communication with a membrane 200. In one exemplary embodiment, the membrane 200 comprises a bi-stable compressively preloaded element, such as a silicon-silicon dioxide element. Referring to FIG. 8, the membrane 200 is rendered in one of two stable states of a bi-stable compressively preloaded element whereby an alternate stable state shown in silhouette. Specifically, the membrane 200 is rendered in a one-half sine wave function configuration.

FIG. 9 illustrates one exemplary embodiment of an apparatus 205 for selectively directing fluid flow. The apparatus 205 includes an inlet 211, a first outlet 213, and a second outlet 214. The inlet 211, the first outlet 213, and the second outlet 214 are each in fluid communication with a membrane 220. In one exemplary embodiment, the membrane 220 comprises a bi-stable compressively preloaded element, such as a silicon-silicon dioxide element. Referring to FIG. 9, the membrane 220 is rendered in one of two stable states of a bi-stable compressively preloaded element. Specifically, the membrane 220 is rendered in a full sine wave function configuration. Therefore, in the closed position, the membrane 220 of FIG. 9 is configured to simultaneously block fluid flow from the inlet 211 to both the first outlet 213 and the second outlet 214.

FIG. 10 illustrates one exemplary embodiment of an apparatus 225 for selectively channeling a high temperature fluid. FIG. 10 is a cut-away side view illustrating the relationship between a seat 231 and a membrane 233 while in a closed position. As shown, the seat 231 is disposed on a manifold body 230. FIG. 10 specifically demonstrates the malleable characteristics of the seat 231 as the membrane 233 contacts the seat 231 while effectively maintaining a seal against high temperature fluid flow. Operatively, the seat 231 is composed of a heat resistant and chemically inert material. In one exemplary embodiment, the seat 231 is composed of a metallic material, such as gold.

FIG. 11 illustrates one exemplary embodiment of an apparatus 235 for selectively channeling a high temperature fluid. FIG. 11 is a cut-away side view illustrating the relationship between a seat 241 and a membrane 244 with a particle defect 245 while in a closed position. In particular, the particle defect 245 is carried by the fluid and becomes lodged between the seat 241 and the membrane 244. FIG. 11 specifically demonstrates the partial deformation of both the seat 241 and membrane 244 to accommodate the particle defect 245 while effectively maintaining a hermetic seal against high temperature fluid flow.

As shown, the seat 241 is disposed on a manifold body 240. Operatively, the seat 241 is composed of a heat resistant and chemically inert material. In one exemplary embodiment, the seat 231 is composed of metal, such as gold.

Figure 12:
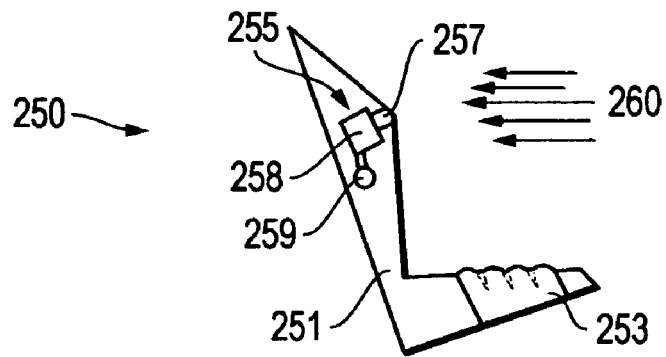
FIG. 12 is a schematic diagram illustrating one exemplary embodiment of a flow control system in engagement with a high temperature fluid, the flow control system including an apparatus for selectively channeling the fluid.

FIG. 12 illustrates one exemplary embodiment of a flow control system 250. The flow control system 250 includes an apparatus 255 for selectively channeling a high temperature fluid 260. The fluid 260 shown in FIG. 12 may comprise a gas, such as air. The apparatus 255 in FIG. 12 is a high temperature, corrosion resistant valve that can be formed as previously described in FIGS. 1-11.

The flow control system 250 of FIG. 12 further includes a hand-held device housing 251. The hand-held device housing 251 in one exemplary embodiment may include a handle-grip portion 253. As shown in FIG. 12, the hand-held device housing 251 may be shaped to enable the apparatus 255 to optimally capture a sample from the fluid 260.

The apparatus 255 of FIG. 12 includes a flow control assembly 257. Operatively, the fluid 260 is directed through the flow control assembly 257. The flow control assembly 257 includes a membrane to selectively channel the fluid through the apparatus 255.

The apparatus 255 further includes an actuator 258. The actuator 258 is coupled to the flow control assembly 257. Operatively, the actuator 258 variably engages the membrane of the flow control assembly 257. In an open position, as a measurement is desired, the fluid 260 is selectively dispensed from the flow control assembly 257 to a sensor 259 coupled to the flow control assembly 257. In effect, the flow control assembly 257 directs the fluid 260 without chemically reacting with the fluid 260. The chemically inert characteristics demonstrated by the fluid control assembly 257 thus enable the sensor 259 to measure a greater variety of constituent particulates carried by the flowing fluid 260. The sensor 259 comprises any sensor well known in the industry, including a sensor for measuring explosive particulates within an air stream. In one exemplary embodiment, the apparatus 255 operates in conditions by which the fluid 260 is channeled through the apparatus 255 at a high temperature.

Figure 13:
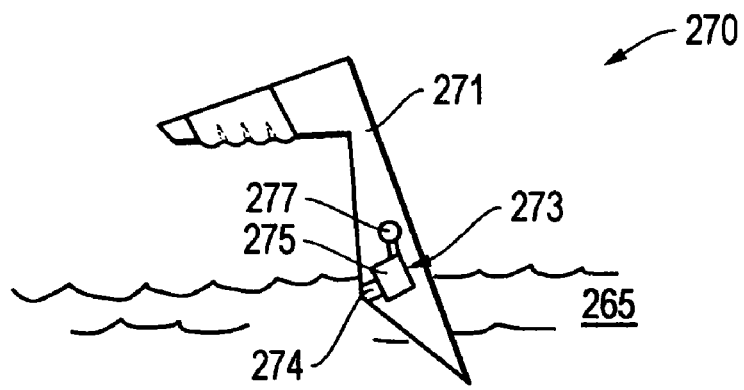
FIG. 13 is a schematic diagram illustrating one exemplary embodiment of a flow control system in partial engagement with a high temperature fluid, the flow control system including an apparatus for selectively channeling the fluid.

FIG. 13 illustrates one exemplary embodiment of a flow control system 270. The flow control system 270 is partially immersed in a fluid 265. As shown in FIG. 13, the fluid 265 comprises a liquid.

The flow control system 270 includes a hand-held device housing 271. The hand-held device housing 271 provides a portable structure by which to carry and use an apparatus 273 for selectively channeling a high temperature fluid therein. The apparatus 273 in FIG. 13 is a high temperature, corrosion resistant valve that can be formed as previously described in FIGS. 1-11.

Referring to FIG. 13, the apparatus 273 includes a flow control assembly 274 and an actuator 275 coupled to the flow control assembly 274. The apparatus 273 further includes a sensor 277 in fluid communication with the flow control assembly 274. The flow control assembly 274 includes a membrane. Accordingly, the membrane permits or prevents the fluid 265 from passing to the sensor 277.

Figure 14:
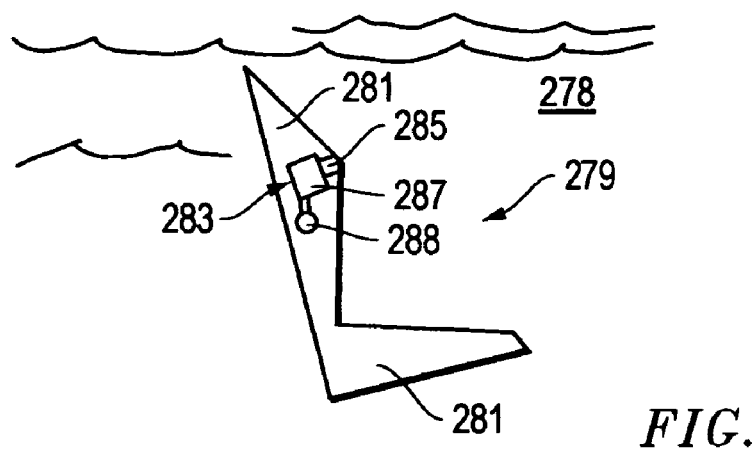
FIG. 14 is a schematic diagram illustrating one exemplary embodiment of a flow control system in engagement with a high temperature fluid, the flow control system including an apparatus for selectively channeling the fluid.

FIG. 14 illustrates one exemplary embodiment of a flow control system 279. The flow control system 279 is completely immersed within a fluid 278. In one exemplary embodiment, as shown in FIG. 14, the fluid 278 comprises a liquid.

The flow control system 279 of FIG. 14 includes an apparatus 283 for selectively channeling the fluid 278. The apparatus 278 in FIG. 14 is a high temperature, corrosion resistant valve that can be formed as previously described in FIGS. 1-11. The flow control system 279 further includes a device housing 281. The device housing 281 provides structural support for the apparatus 283. The apparatus 283 includes a flow control assembly 285 and a sensor 288 coupled to the flow control assembly 285. Operatively, the fluid 288 is selectively channeled through the flow control assembly 285 to the sensor 288.

Although the present invention has been described in detail, it should be understood that various changes, substitutions, and alterations could be made hereto without departing from the spirit and scope of the invention as defined by the appended claims.

I claim:

1. A valve, comprising:
   a valve inlet for admitting a fluid;
   a bi-stable compressively preloaded membrane comprising layers of silicon and silicon dioxide bonded together, with the membrane being moveable between two stable states with one stable state defining a closed position and with the other stable state defining an open position; and
   a bi-stable actuation mechanism operatively connected to the compressively preloaded membrane and responsive to an electrical actuation voltage to switch the compressively preloaded membrane alternately between the closed and open positions, with the compressively preloaded membrane in the closed position blocking flow at the valve inlet, and with the compressively preloaded membrane in the open position channeling fluid flow from the valve inlet.

2. The valve according to claim 1 wherein the valve inlet port comprises a material selected from the group consisting of silicon and glass.

3. The valve according to claim 1 further comprising a metallic valve seat which is contact by the bi-stable compressively preloaded membrane in the closed position.

4. The valve according to claim 3 wherein the metallic valve seat comprises a malleable metal.

5. The valve according to claim 4 wherein the malleable metal comprises gold.

6. The valve according to claim 1 wherein the bi-stable actuation mechanism comprises a solenoid operable in combination with a rare-earth permanent magnet.

7. The valve according to claim 6 wherein the solenoid is responsive to the electrical actuation voltage to switch the bi-stable compressively preloaded membrane between the open and closed positions, and the rare-earth permanent magnet holds the compressively preloaded membrane in position after the electrical actuation voltage.

8. The valve according to claim 6 wherein the rare-earth permanent magnet comprises a samarium-cobalt (Sm—Co) rare-earth permanent magnet.

9. The valve according to claim 1 wherein the valve is operable at a temperature of up to 350 degrees Celsius.

* * * * *